(12) United States Patent
Park et al.

(10) Patent No.: US 12,088,345 B2
(45) Date of Patent: Sep. 10, 2024

(54) TRANSCEIVER

(71) Applicant: SAMSUNG DISPLAY CO., LTD., Yongin-si (KR)

(72) Inventors: Dong Won Park, Yongin-si (KR); Jun Dal Kim, Yongin-si (KR); Hyun Su Kim, Yongin-si (KR); Jong Man Bae, Yongin-si (KR); Jun Yong Song, Yongin-si (KR); Tae Young Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 161 days.

(21) Appl. No.: 17/959,471

(22) Filed: Oct. 4, 2022

(65) Prior Publication Data
US 2023/0170997 A1 Jun. 1, 2023

(30) Foreign Application Priority Data
Nov. 30, 2021 (KR) .................. 10-2021-0168928

(51) Int. Cl.
*H04B 10/40* (2013.01)
*G06F 1/04* (2006.01)
*H04B 1/04* (2006.01)
*H04B 1/16* (2006.01)
*H04B 10/516* (2013.01)

(52) U.S. Cl.
CPC ............ *H04B 10/40* (2013.01); *G06F 1/04* (2013.01); *H04B 1/04* (2013.01); *H04B 1/16* (2013.01); *H04B 10/516* (2013.01)

(58) Field of Classification Search
None
See application file for complete search history.

(56) References Cited

U.S. PATENT DOCUMENTS

| 10,542,312 | B1* | 1/2020 | Bassett | H04L 7/042 |
|---|---|---|---|---|
| 2017/0132966 | A1 | 5/2017 | Lim et al. | |
| 2019/0147831 | A1 | 5/2019 | Lee et al. | |
| 2020/0193884 | A1 | 6/2020 | Kim et al. | |
| 2021/0201734 | A1 | 7/2021 | Kim et al. | |
| 2022/0399915 | A1* | 12/2022 | Kim | H04L 5/0053 |

OTHER PUBLICATIONS

Lee Pil-Ho et al "A 20-GB/s Receiver Bridge Chip With Auto-Skew Calibration for MIPI D-PHY Interface" IEEE Service Center, NY, vol. 65, No. 4, Nov. 1, 2019, pp. 484-492.

* cited by examiner

Primary Examiner — Stephen T. Reed
(74) Attorney, Agent, or Firm — CANTOR COLBURN LLP

(57) ABSTRACT

A transceiver includes a transmitter and a receiver which are connected to each other through a first line and a second line. The transmitter transmits a first clock training pattern to the receiver in a first period, transmits a second clock training pattern and a first first payload to the receiver in a second period, and transmits a third clock training pattern and a second first payload to the receiver in a third period. The first clock training pattern, the second clock training pattern, and the third clock training pattern are variable based on a plurality of driving modes.

20 Claims, 13 Drawing Sheets

FIG. 8

| DRIVING MODE | CLK-T1 | CLK-T2 | CLK-T3 |
|---|---|---|---|
| DRM1 | UB4 | UB4 | UB4 |
| DRM2 | UB4 | Not CLK-T1 | Not CLK-T2 |
| DRM3 | Not CLK-T2 and Not CLK-T3 | UB4 | UB4 |
| DRM4 | Not CLK-T2 and Not CLK-T3 | Not CLK-T1 and Not CLK-T3 | Not CLK-T1 and Not CLK-T2 |

FIG. 9

| | Clock-Training Pattern | Length (Bit) |
|---|---|---|
| UB1 | 24b'000111_111000_000111_111000 | 24 |
| UB2 | 24b'000111_000111_000111_000111 | |
| UB3 | 24b'001101_001101_001101_001101 | |
| UB4 | 24b'010101_010101_010101_010101 | |

FIG. 10

| DRIVING MODE | CLK-T1 | CLK-T2 | CLK-T3 |
|---|---|---|---|
| DRM1_1 | UB4 | UB4 | UB4 |
| DRM2_1 | UB4 | Shuffle patterns | Shuffle patterns |
| DRM3_1 | Shuffle patterns | UB4 | UB4 |
| DRM4_1 | Shuffle patterns | Shuffle patterns | Shuffle patterns |

TRANSCEIVER

This application claims priority to Korean Patent Application No. 10-2021-0168928, filed on Nov. 30, 2021, and all the benefits accruing therefrom under 35 U.S.C. § 119, the content of which in its entirety is herein incorporated by reference.

BACKGROUND

1. Field

The disclosure relates to a transceiver.

2. Description of the Related Art

As an information technology is developed, importance of a display device that is a connection medium between a user and information is emphasized. Accordingly, a display device such as a liquid crystal display device and an organic light emitting display device has been widely used in various fields.

SUMMARY

In general, a display device may perform internal communication using a mobile industry processor interface ("MIPI") protocol. At this time, a clock line may be separately used for the internal communication using the MIPI protocol. When the clock line exists, there is a disadvantage in that physical/spatial cost increases and power consumption increases.

Embodiments of the disclosure provide a transceiver including a plurality of modes for reducing a locking time of a clock training pattern and prevention of occurrence of electromagnetic interference.

According to an embodiment of the disclosure, a transceiver includes a transmitter and a receiver, which are connected to each other through a first line and a second line. In such an embodiment, the transmitter transmits a first clock training pattern to the receiver in a first period, transmits a second clock training pattern and a first first payload to the receiver in a second period, and transmits a third clock training pattern and a second first payload to the receiver in a third period. In such an embodiment, the first clock training pattern, the second clock training pattern, and the third clock training pattern are variable based on a plurality of driving modes.

In an embodiment, a length of the first clock training pattern may be longer than a length of the second clock training pattern and a length of the third clock training pattern.

In an embodiment, the length of the second clock training pattern may be longer or shorter than the length of the third clock training pattern.

In an embodiment, the transmitter may transmit signals having a first voltage range to the first line and the second line in a first mode, and the transmitter may transmit signals having a second voltage range less than the first voltage range to the first line and the second line in a second mode.

In an embodiment, the transmitter may transmit the first clock training pattern, the second clock training pattern, and the third clock training pattern to the receiver in the second mode.

In an embodiment, the transmitter may include a burst mode including the first mode between the second modes and a non-burst mode which does not includes the first mode between the second modes.

In an embodiment, the driving modes may include a first driving mode in which all of the first clock training pattern, the second clock training pattern, and the third clock training pattern have a maximum frequency, a second driving mode in which only the first clock training pattern has the maximum frequency, a third driving mode in which only the second clock training pattern and the third clock training pattern have the maximum frequency, and a fourth driving mode in which all of the first clock training pattern, the second clock training pattern, and the third clock training pattern do have the maximum frequency.

In an embodiment, the second clock training pattern may be different from the first clock training pattern, and the third clock training pattern may be different from the second clock training pattern in the second driving mode.

In an embodiment, both of the second clock training pattern and the third clock training pattern may be shuffle patterns in the second driving mode.

In an embodiment, the first clock training pattern may be different from both of the second clock training pattern and the third clock training pattern in each of the third driving mode and the fourth driving mode.

In an embodiment, the first clock training pattern may be a shuffle pattern in the third driving mode.

In an embodiment, the second clock training pattern may be different from both of the first clock training pattern and the third clock training pattern in the fourth driving mode.

In an embodiment, the third clock training pattern may be different from both of the first clock training pattern and the second clock training pattern in the fourth driving mode.

In an embodiment, all of the first clock training pattern, the second clock training pattern, and the third clock training pattern are shuffle patterns in the fourth driving mode.

In an embodiment, the first driving mode and the third driving mode may be driven in the burst mode, and the second driving mode may be driven in the non-burst mode.

In an embodiment, the transmitter may generate the first first payload and the second first payload by encoding first data including image information.

In an embodiment, the first first payload may correspond to a first pixel row in one frame of the first data, and the second first payload may correspond to a second pixel row of the first data.

In an embodiment, the first first payload may correspond to a second frame of the first data, and the second first payload may correspond to a third frame of the first data.

In an embodiment, the transmitter may further transmit a fourth clock training pattern and a third first payload to the receiver in a fourth period, and a length of the first clock training pattern may be longer than a length of the second clock training pattern, a length of the second clock training pattern, a length of the third clock training pattern, and a length of the fourth clock training pattern.

In an embodiment, the length of the third clock training pattern may be longer than both of the length of the second clock training pattern and the length of the fourth clock training pattern.

In embodiments of the invention, the transceiver may optimize clock training performance in consideration of a trade-off relationship of reduction of a locking time of a clock training pattern and reduction of electromagnetic interference, by variously changing a length of the clock training pattern and a bit combination of the clock training pattern.

BRIEF DESCRIPTION OF THE DRAWINGS

The above and other features of the disclosure will become more apparent by describing in further detail embodiments thereof with reference to the accompanying drawings, in which:

FIG. 8 is a table illustrating a set of first to third clock training patterns for each of first to fourth driving modes according to an embodiment;

FIG. 9 is a table illustrating unit bits configuring the first to third clock training patterns according to an embodiment;

FIG. 10 is a table illustrating a set of the first to third clock training patterns for each of the first to fourth driving modes according to an alternative embodiment;

DETAILED DESCRIPTION

Figure 1:
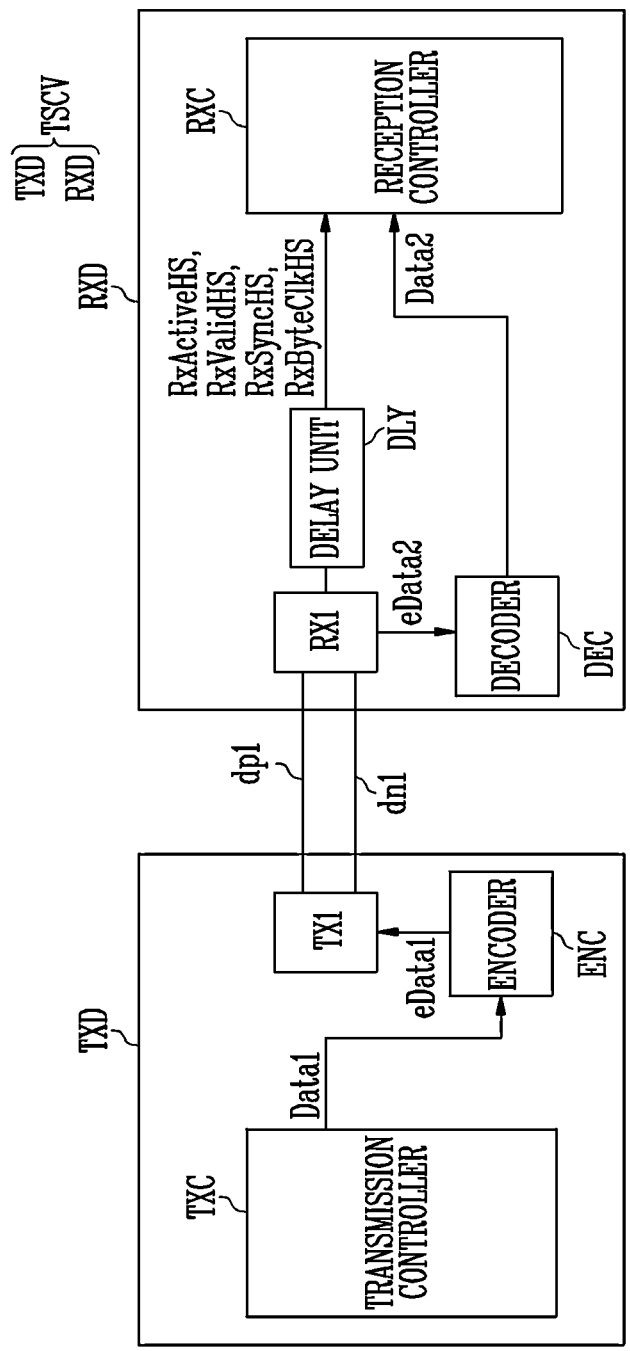
FIGS. 1 and 2 are diagrams illustrating a transceiver according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In order to clearly describe the disclosure, parts that are not related to the description are omitted, and like reference numerals refer to like elements throughout. Therefore, the reference numerals used in one drawings may be used in another drawing.

In addition, sizes and thicknesses of each component shown in the drawings are arbitrarily shown for convenience of description, and thus the disclosure may not be limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 2:
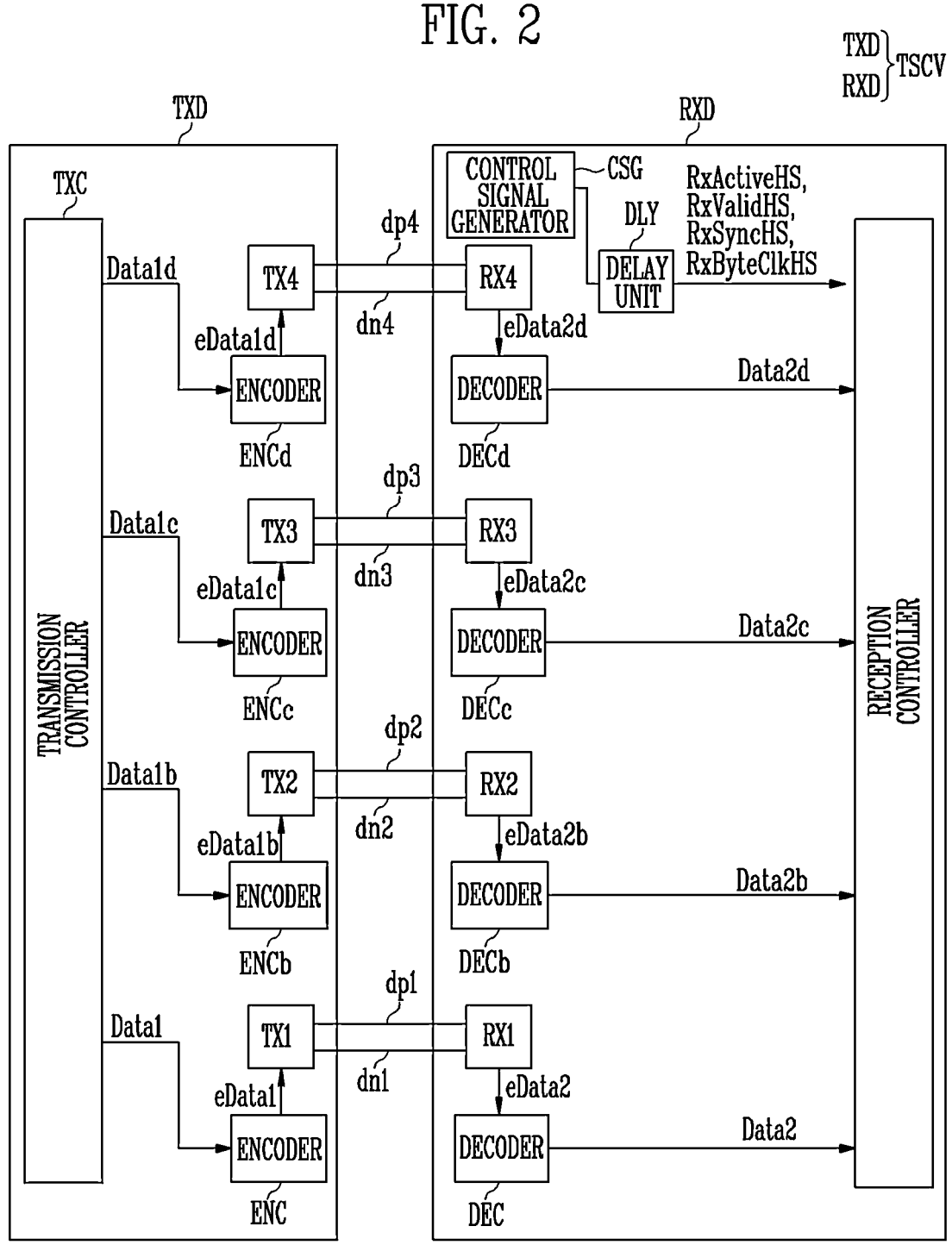

FIGS. 1 and 2 are diagrams illustrating a transceiver according to an embodiment.

Referring to FIGS. 1 and 2, an embodiment of the transceiver TSCV may include a transmitter TXD and a receiver RXD.

The transmitter TXD may include a transmission controller TXC, a first data transmission unit TX1, and an encoder ENC. The receiver RXD may include a reception controller RXC, a first data reception unit RX1, a decoder DEC, and a delay unit DLY.

The first data transmission unit TX1 may be connected to the first data reception unit RX1 through a first line dp1 and a second line dn1. The first data transmission unit TX1 and the first data reception unit RX1 may be referred to as a first data channel. The first data transmission unit TX1 and the first data reception unit RX1 may correspond to a physical layer and a data link layer of an OSI 7 layer model, may correspond to a network interface of a TCP/IP protocol, or may correspond to a physical layer of a mobile industry processor interface ("MIPI") protocol. The physical layer of the MIPI protocol may be configured according to various predetermined specifications, such as D-PHY, C-PHY, and M-PHY. Hereinafter, embodiments where the first data transmission unit TX1 and the first data reception unit RX1 are configured according to the D-PHY specification among the physical layers of the MIPI protocol will be described in detail for convenience of description.

The transmission controller TXC and the reception controller RXC may correspond to a network layer and a transport layer of the OSI 7 layer model, or may correspond to Internet and transport of the TCP/IP protocol, or may correspond to a protocol layer of the MIPI protocol. The protocol layer of the MIPI protocol may be configured according to various predefined specifications such as a display serial interface ("DSI") and a camera serial interface ("CSI"). Hereinafter, embodiments where the transmission controller TXC and the reception controller RXC are configured according to the DSI specification among the protocol layers of the MIPI protocol will be described for convenience of description.

In an embodiment, the transmission controller TXC, the first data transmission unit TX1, and the encoder ENC may be configured separately from each other in hardware, or may have a configuration in which two or more thereof are integrated in hardware. In an embodiment, the transmission controller TXC, the first data transmission unit TX1, and the encoder ENC may be configured separately from each other in software, or may have a configuration in which two or more thereof are integrated in software. In an embodiment, the transmitter TXD may be configured as a part (hardware or software) of another controller (for example, an application processor ("AP"), a graphics processing unit ("GPU"), a central processing unit ("CPU"), or the like), or may be configured as independent hardware (for example, a transmission dedicated integrated circuit ("IC")).

In an embodiment, the reception controller RXC, the first data reception unit RX1, the decoder DEC, and the delay unit DLY may be separately from each other in hardware, or may have a configuration in which two or more thereof are integrated in hardware. In an embodiment, the reception controller RXC, the first data reception unit RX1, the decoder DEC, and the delay unit DLY may be configured separately from each other in software, or may have a configuration in which two or more thereof are integrated in software. In an embodiment, the receiver RXD may be configured as a part (hardware or software) of another controller (for example, a timing controller ("TCON"), a TCON embedded driver IC ("TED"), a driver IC ("D-IC"), or the like), or may be configured as independent hardware (for example, a reception dedicated IC).

The transmission controller TXC may provide first data Data1 including a third payload (that is, an original payload) to the encoder ENC. The encoder ENC may encode the first data Data1 to generate first encoded data eData1 including a first payload ePayload (refer to FIG. 3), and provide the first encoded data eData1 to the first data transmission unit TX1. The first data transmission unit TX1 may transmit other data by adding the other data before and after (i.e., prior to and subsequent to) the first encoded data eData1 according to a predetermined protocol.

The first data reception unit RX1 may generate a clock signal using the first encoded data eData1 and sample data received through the first line dp1 and the second line dn1 based on the generated clock signal. In an embodiment, for example, as shown in FIG. 6, the first data reception unit RX1 may include a clock data recovery circuit CDR, a de-serializer DES, a register REG, and the like. The first data reception unit RX1 may provide second encoded data eData2 including the same first payload ePayload (refer to FIG. 5) as the first encoded data eData1 to the decoder DEC. The decoder DEC may decode the second encoded data eData2 to generate second data Data2 including a same payload as the first data Data1, and provide the second data Data2 to the reception controller RXC.

In an embodiment, the first data reception unit RX1 may generate a plurality of control signals RxActiveHS, RxValidHS, RxSyncHS, and RxByteClkHS according to a protocol. In such an embodiment, the delay unit DLY may delay the plurality of control signals RxActiveHS, RxValidHS, RxSyncHS, and RxByteClkHS by a decoding time and provide the plurality of control signals RxActiveHS, RxValidHS, RxSyncHS, and RxByteClkHS to the reception controller RXC. Here, the decoding time may be a time used for the decoder DEC to decode the second encoded data eData2 to generate the second data Data2.

In such an embodiment, the control signal RxByteClkHS may be a clock signal for informing a data transmission unit of a byte unit. In an embodiment, for example, the control signal RxByteClkHS may indicate that one byte of the second data Data2 is transmitted for each one cycle of the control signal RxByteClkHS. In such an embodiment, the control signal RxByteClkHS may be a clock signal used for data processing in the reception controller RXC. In an embodiment, for example, the control signal RxByteClkHS may be the entire system clock for data processing after the de-serializer.

In an embodiment, for example, the transceiver TSCV may be configured with one data channel as shown in FIG. 1, but not being limited thereto. Alternatively, the transceiver TSCV may be configured with a plurality of data channels (for example, four data channels) as shown in FIG. 2.

Referring to FIG. 2, in an alternative embodiment, the transmitter TXD may further include second to fourth data transmission units TX2, TX3, and TX4 and corresponding encoders ENCb, ENCc, and ENCd. The receiver RXD may further include second to fourth data reception units RX2, RX3, and RX4 and corresponding decoders DECb, DECc, and DECd. In such an embodiment, the receiver RXD may further include a control signal generator CSG and the delay unit DLY.

The second data transmission unit TX2 may be connected to the second data reception unit RX2 through a first line dp2 and a second line dn2. The second data transmission unit TX2 and the second data reception unit RX2 may be referred to as a second data channel. The third data transmission unit TX3 may be connected to the third data reception unit RX3 through a first line dp3 and a second line dn3. The third data transmission unit TX3 and the third data reception unit RX3 may be referred to as a third data channel. The fourth data transmission unit TX4 may be connected to the fourth data reception unit RX4 through a first line dp4 and a second line dn4. The fourth data transmission unit TX4 and the fourth data reception unit RX4 may be referred to as a fourth data channel. The plurality of data channels may transmit and receive data independent of each other.

In such an embodiment, an operation of the encoders ENCb, ENCc, and ENCd encoding data Data1b, Data1c, and Data1d to generate encoded data eData1b, eData1c, and eData1d is substantially the same as an operation of the encoder ENC described above with reference to FIG. 1, and thus, any repetitive detailed description thereof will be omitted.

In such an embodiment, an operation of the decoders DECb, DECc, and DECd decoding encoded data eData2b, eData2c, and eData2d to generate data Data2b, Data2c, and Data2d is substantially the same as an operation of the decoder DEC described above with reference to FIG. 1, and thus, any repetitive detailed description thereof will be omitted.

The control signal generator CSG may generate the control signals RxActiveHS, RxValidHS, RxSyncHS, and RxByteClkHS using data received by the second to fourth data reception units RX2, RX3, and RX4. In an embodiment, for example, the control signal generator CSG may align a timing of the data received by the second to fourth data reception units RX2, RX3, and RX4, and generate the control signals RxActiveHS, RxValidHS, RxSyncHS, and RxByteClkHS based on the aligned data.

The delay unit DLY may delay the plurality of control signals RxActiveHS, RxValidHS, RxSyncHS, and RxByteClkHS by a decoding time and provide the plurality of control signals RxActiveHS, RxValidHS, RxSyncHS, and RxByteClkHS to the reception controller RXC. Here, the decoding time may be a time required for the decoders DEC, DECb, DECc, and DECd to decode the second encoded data eData2, eData2b, eData2c, and eData2d to generate the second data Data2, Data2b, Data2c, and Data2d. In an embodiment, for example, when the decoding times of the decoders DEC, DECb, DECc, and DECd are different from each other, the delay unit DLY may delay the plurality of control signals RxActiveHS, RxValidHS, RxSyncHS, and RxByteClkHS based on the slowest decoding time.

Hereinafter, an embodiment of the transmitter will be described with reference to FIGS. 3 and 4.

Figure 3:
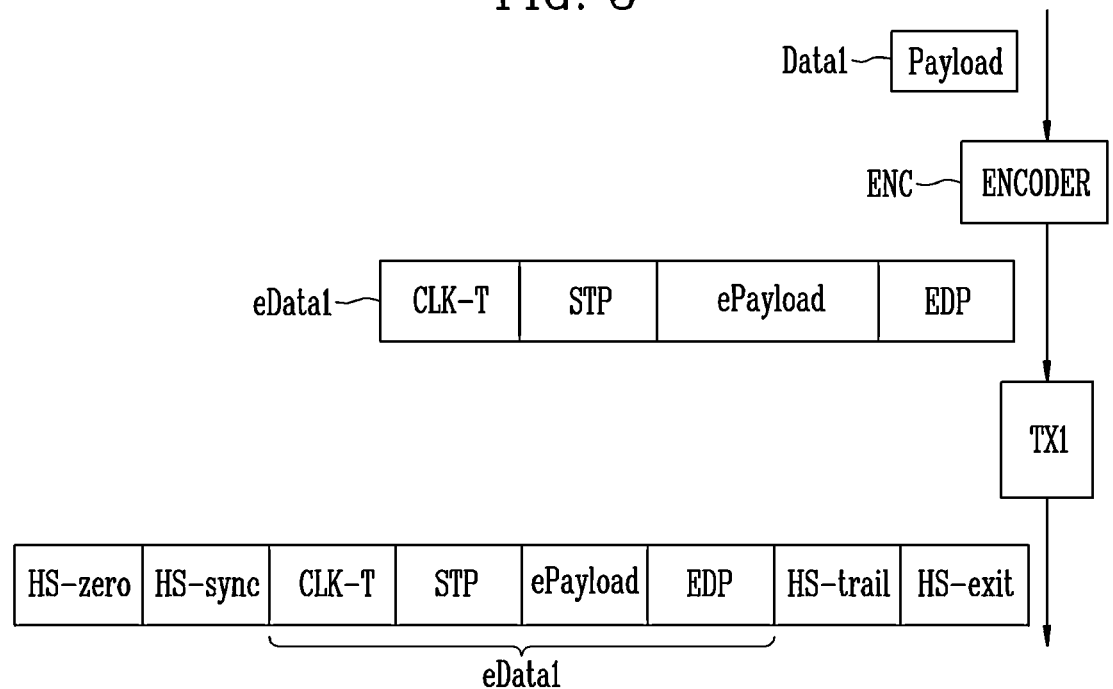
FIGS. 3 and 4 are diagrams illustrating an operation of an embodiment of a transmitter shown in FIGS. 1 and 2.
Figure 4:
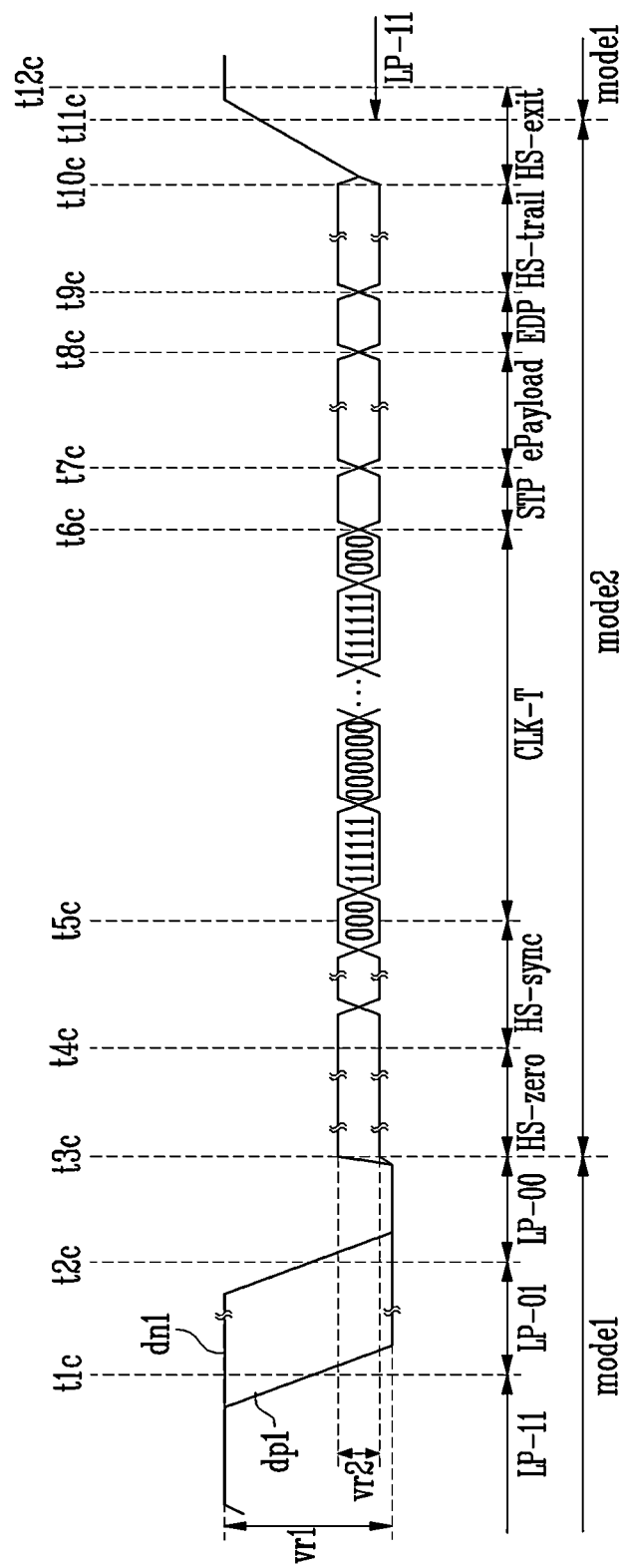

FIGS. 3 and 4 are diagrams illustrating an operation of an embodiment of the transmitter shown in FIGS. 1 and 2.

Referring to FIG. 3, in an embodiment, the encoder ENC may receive the first data Data1 including the third payload Payload. The encoder ENC may encode the third payload Payload to generate a first payload ePayload, and add data before and after the first payload ePayload to generate the first encoded data eData1. In an embodiment, for example, the first encoded data eData1 may sequentially include a clock training pattern CLK-T, a start pattern STP, the first payload ePayload, and an end pattern EDP.

The clock training pattern CLK-T may include clock information. The receiver RXD may generate a clock signal having a specific frequency and a specific phase based on or by using the clock information. In an embodiment, for example, the clock training pattern CLK-T may be a combination of bits in which one 1 and one 0 are repeated alternately with each other (for example, 01010101 . . . ). A frequency and a phase of the clock signal generated by the clock data recovery circuit of the receiver RXD may be affected or undesirably changed by an external factor (noise, temperature, or the like). The receiver RXD may correct the frequency and the phase of the clock signal using the clock training pattern CLK-T. In an alternative embodiment, for example, the clock training pattern CLK-T may be a combination of bits in which a plurality of successive 0s and a plurality of successive 1s are repeated alternately with each other (for example, 00001111000001111 . . . ). In an embodiment, frequency information and phase information indicated by the clock training pattern CLK-T may vary according to the number of the plurality of successive 0s or the number of the plurality of successive 1s.

In an embodiment, a time for tracking frequency information and/or phase information of the clock training pattern CLK_T, that is, a locking time may be changed in response to the combination of bits included in the clock training pattern CLK-T. In an embodiment, for example, when transition (change from 0 to 1 or change from 1 to 0) of the clock training pattern CLK_T is a maximum (for example, 01010101 . . . ), since a clock signal having specific frequency and phase may be quickly generated using the clock training pattern CLK-T, the locking time of the clock training pattern CLK T may be reduced. In such an embodiment, when the transition of the clock training pattern CLK_T is the maximum, a frequency of the clock training pattern CLK_T becomes a maximum, and thus electromagnetic interference may occur in the transceiver TSCV.

That is, when the locking time of the clock training pattern CLK_T is to be reduced, the electromagnetic interference may occur in the transceiver TSCV. As described above, the reduction of the locking time of the clock training pattern CLK_T and prevention of the electromagnetic interference may be a trade-off relationship. Embodiments of the disclosure provide a transceiver capable of providing a plurality of driving modes optimized between two targets of the reduction of the locking time of the clock training pattern CLK_T and the prevention of the occurrence of the electromagnetic interference. This will be described in detail later with reference to FIGS. 7 to 10.

The start pattern STP may be a pattern informing a transmission start of the first payload ePayload. The start pattern STP may be a pattern that the first payload ePayload which is in an encoded state may not include (=use inhibited). In an embodiment, for example, the start pattern STP may be configured as 24b'011100 000000 111111 110001'.

The first payload ePayload may include the clock information. In an embodiment, for example, when there are many successive 0s or many successive 1s in the third payload Payload, since transition of a signal may be small, a phase correction of the clock signal may not be sufficiently performed in the first data reception unit RX1, and a skew of the clock signal may occur. Therefore, the encoder ENC may performing encoding so that the number of transitions (change from 0 to 1 or change from 0 to 1) of the first payload ePayload is great compared to the third payload Payload. In an embodiment, the encoder ENC may performing encoding so that the first payload ePayload periodically has a bit of a specific rule.

The end pattern EDP may be a pattern informing a transmission end of the first payload ePayload. In an embodiment, for example, the end pattern EDP may be configured as 24b'011100_111111_000000_110001'. The end pattern EDP may be a pattern that the first payload ePayload which is in the encoded state may not include (=use inhibited).

The first data transmission unit TX1 may receive the first encoded data eData1 including the first payload ePayload. The first data transmission unit TX1 may transmit other data by adding the other data before and after the first encoded data eData1 according to a predetermined protocol. In an embodiment, for example, when the predetermined protocol is the MIPI protocol, the first data transmission unit TX1 may sequentially transmit a pattern HS-zero, a pattern HS-sync, the first encoded data eData1, a pattern HS-trail, and a pattern HS-exit.

Referring to FIG. 4, the transmitter TXD (in particular, the first data transmission unit TX1) may transmit signals having a first voltage range vr1 to the first line dp1 and the second line dn1 in a first mode mode1. In an embodiment, the transmitter TXD may transmit signals having a second voltage range vr2 less than the first voltage range vr1 to the first line dp1 and the second line dn1 in a second mode mode2.

In an embodiment, for example, an upper limit of the first voltage range vr1 may be greater than an upper limit of the second voltage range vr2, and a lower limit of the first voltage range vr1 may be less than a lower limit of the second voltage range vr2. In an embodiment where the MIPI protocol is applied to the transceiver TSCV, the first mode mode1 may be a low power ("LP") mode, and the second mode mode2 may be a high speed ("HS") mode.

In the first mode mode1, the first line dp1 and the second line dn1 may be used in a single-ended method. That is, the signals transmitted to each of the first line dp1 and the second line dn1 in the first mode mode1 may be the same as or different from each other. In an embodiment, in the second mode mode2, the first line dp1 and the second line dn1 may be used in a differential method. That is, the signals transmitted to each of the first line dp1 and the second line dn1 in the second mode mode2 are different from each other. The first line dp1 may be a positive line, and the second line dn1 may be a negative line.

In transmitting the first payload ePayload to the receiver RXD, the transmitter TXD may be sequentially driven in the first mode mode1, the second mode mode2, and the first mode mode1, and the transmitter TXD may transmit the clock training pattern CLK-T and the first payload ePayload in the second mode mode2.

In an embodiment, the transmitter TXD may transmit the predefined patterns (for example, a pattern LP-11, a pattern LP-01, and a pattern LP-00) to the first line dp1 and the second line dn1 to inform the switch from the first mode mode1 to the second mode mode2.

In an embodiment, for example, the transmitter TXD may maintain the signals applied to the first line dp1 and the second line dn1 as a logic high level before a time point t1c (LP-11 pattern). When a voltage level of the signal is greater than a first predefined threshold voltage level, the voltage level of the signal may be determined as the logic high level, and when the voltage level of the signal is less than a predefined second threshold voltage level, the voltage level of the signal may be determined as a logic low level. Next, at the time point t1c, the transmitter TXD may change the signal of the first line dp1 to the logic low level and maintain the signal of the second line dn1 as the logic high level (that is, the pattern LP-01). Next, at a time point t2c, the transmitter TXD may maintain the signal of the first line dp1 as the logic low level and change the signal of the second line dn1 to the logic low level (that is, the pattern LP-00).

Next, in the second mode mode2, the transmitter TXD may sequentially transmit the pattern HS-zero, the pattern HS-sync, the first encoded data eData1, the pattern HS-trail, and the pattern HS-exit described above. In an embodiment, for example, the transmitter TXD may transmit the pattern HS-zero during a period from a time point t3c to a time point t4c, transmit the pattern HS-sync during a period from the time point t4c to a time point t5c, transmit the clock training pattern CLK-T during a period from the time point t5c to a time point t6c, transmit the start pattern STP during a period from the time point t6c to a time point t7c, transmit the first payload ePayload during a period from the time point tc7 to a time point tc8, transmit the end pattern EDP during a period from the time point t8c to a time point t9c, transmit the pattern HS-trail during a period from the time point t9c to a time point t10c, and transmit the pattern HS-exit after a time point t10c.

The pattern HS-zero may be a pattern for informing a waiting period after entering from the first mode mode1 to the second mode mode2. In an embodiment, for example, the pattern HS-zero may be an pattern in which 0 is repeated.

The pattern HS-sync may be a pattern informing a transmission start of the first encoded data eData1. In an embodiment, for example, the pattern HS-sync may have OxB8h value or 00011101 value.

The pattern HS-trail may be a pattern informing a transmission end of the first encoded data eData1. The pattern HS-trail may be a pattern in which a value opposite to last data of the first encoded data eData1 is repeated. For example, when the last data (bit) of first encoded data eData1 is 0, the pattern HS-trail may be a pattern in which 1 is repeated. In an embodiment, for example, when the last data (bit) of the first encoded data eData1 is 1, the pattern HS-trail may be a pattern in which 0 is repeated.

The pattern HS-exit may be a pattern informing that the second mode mode2 is ended and the first mode mode1 is started. The pattern HS-exit may not be configured of a specific bit, but may be a transitional pattern in which a voltage is increased to exceed the second voltage range vr2.

The transmitter TXD may change the signals applied to the first line dp1 and the second line dn1 to the logic high level during a period including a time point t11c and maintain the signals applied to the first line dp1 and the second line dn1 to the logic high level from a time point t12c (that is, the pattern LP-11). Accordingly, the transmitter TXD may inform that the second mode mode2 is ended and the first mode mode1 is started.

The receiver RXD may generate the clock signal using the clock training pattern CLK-T and the first payload ePayload. The first data reception unit RX1 may include a clock data recovery circuit CDR (refer to FIG. 6) and may generate a clock signal having specific frequency and phase using the clock training pattern CLK-T. In addition, the first data reception unit RX1 may continuously correct the phase of the clock signal to prevent skew of the clock signal using the encoded data eData1. The first data reception unit RX1 may sample the received data using the generated clock signal. Therefore, in such an embodiment, the transceiver TSCV may perform communication using the MIPI protocol without a clock line.

Hereinafter, an embodiment of the receiver will be described with reference to FIGS. 5 and 6.

Figure 5:
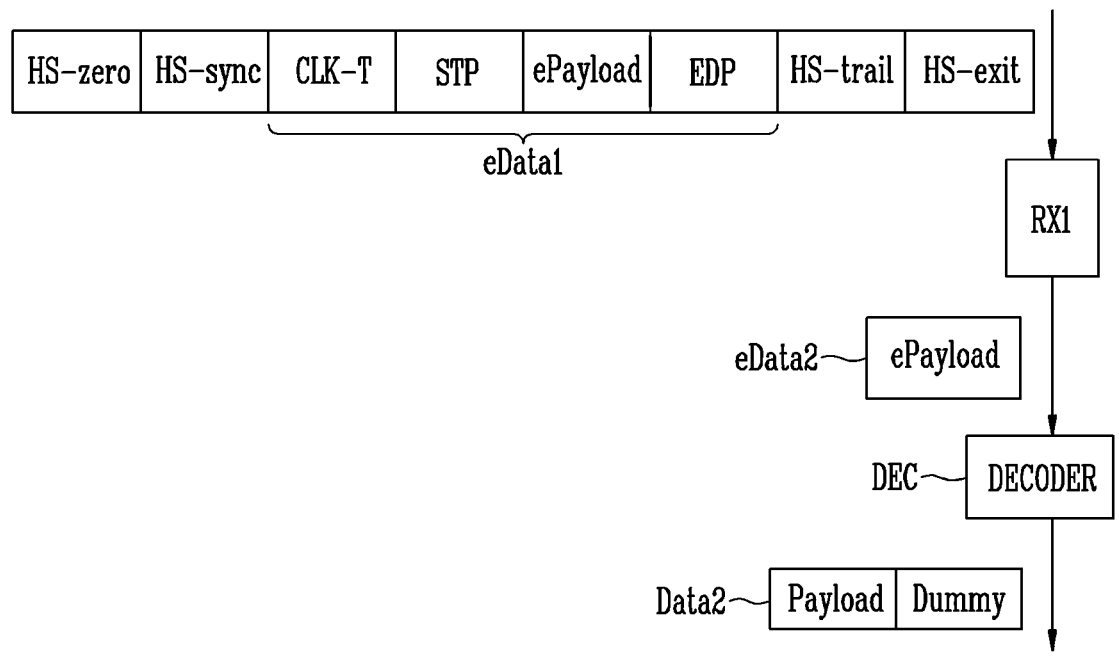
FIG. 5 is a diagram illustrating an operation of a receiver according to an embodiment.
Figure 6:
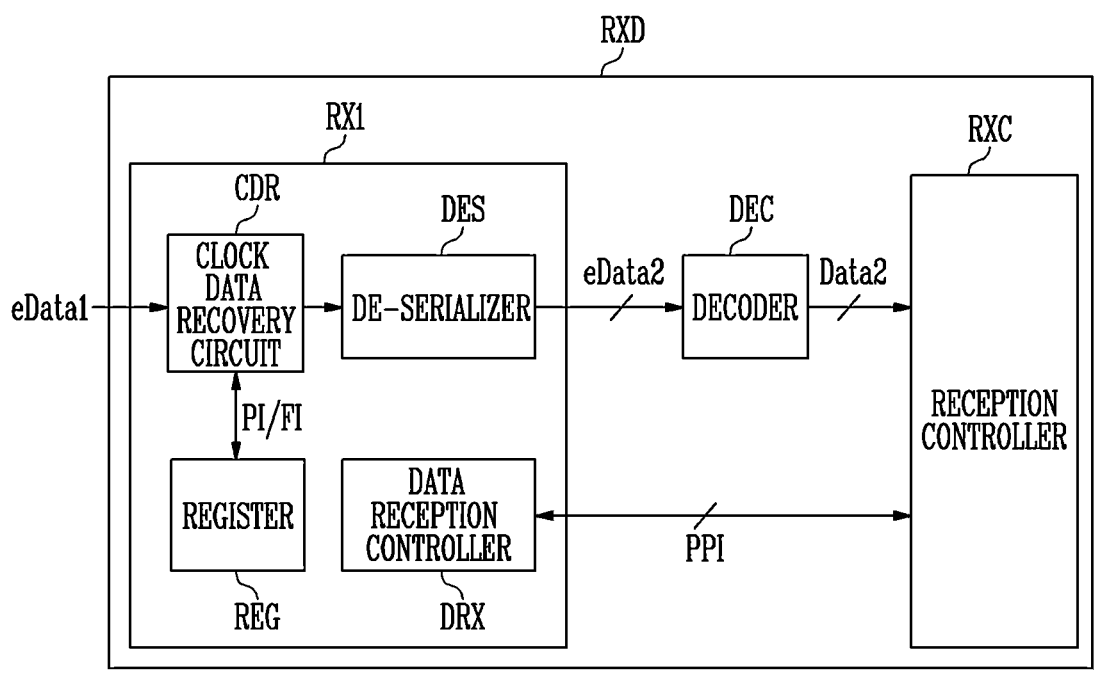
FIG. 6 is a diagram illustrating a configuration of a receiver according to an embodiment.

FIG. 5 is a diagram illustrating an operation of a receiver according to an embodiment, and FIG. 6 is a diagram illustrating a configuration of a receiver according to an embodiment. Hereinafter, an embodiment of the receiver will be described with reference to FIGS. 5 and 6 together with FIGS. 1 to 4.

Referring to FIG. 5, in an embodiment, the first data reception unit RX1 may provide the second encoded data eData2 including the first payload ePayload among the received data to the decoder DEC.

The decoder DEC may decode the second encoded data eData2 (that is, the first payload ePayload) to generate the second data Data2, and provide the generated second data Data2 to the reception controller RXC. The second data Data2 may include a second payload Payload and a dummy pattern Dummy. The second payload Payload is the same as the third payload of the first data Data1 provided by the transmission controller TXC.

The dummy pattern Dummy may be encoded in advance to be embedded in the first payload ePayload by the encoder ENC, or may be added by the decoder DEC. The dummy pattern Dummy may be data in which a same value is repeated. In an embodiment, for example, when the last value of the second payload Payload is 0, the dummy pattern Dummy is data in which 1 is repeated, and when the last value of the second payload Payload is 1, the dummy pattern Dummy may be data in which 0 is repeated.

Referring to FIGS. 5 and 6, an embodiment of the first data reception unit RX1 may include the clock data recovery circuit CDR, the de-serializer DES, the register REG, and a data reception controller DRX.

The clock data recovery circuit CDR may generate the clock signal corresponding to the received clock training pattern. That is, the clock data recovery circuit CDR may generate frequency information and phase information of the received clock training pattern CLK_T.

In an embodiment, for example, the clock data recovery circuit CDR may receive a first clock training pattern, generate a first clock signal based on first frequency information and first phase information of the first clock training pattern, receive a second clock training pattern, generate a second clock signal using second frequency information and second phase information of the second clock training pattern, receive a third clock training pattern, and generate a third clock signal based on third frequency information and third phase information of the third clock training pattern.

The clock data recovery circuit CDR may store the frequency information FI and the phase information PI of the clock training pattern in the register REG, and receive the stored frequency information FI and the phase information PI from the register REG. That is, the clock data recovery circuit CDR may store the first frequency information and the first phase information of the first clock training pattern in the register REG, and thereafter, may use the frequency information FI and the phase information PI stored in the register REG when generating the frequency information FI and the phase information PI of the clock training pattern.

In an embodiment, for example, the clock data recovery circuit CDR may generate second frequency information of the second clock training pattern based on the first frequency information, and may generate second phase information of the second clock training pattern based on the first phase information. In such an embodiment, the clock data recovery circuit CDR may generate third frequency information of the third clock training pattern based on the second frequency information, and may generate third phase information of the third clock training pattern based on the second phase information.

According to an embodiment, the clock data recovery circuit CDR may use the first frequency information as the third frequency information of the third clock training pattern, and may generate the third phase information of the third clock training pattern based on the second phase information.

The de-serializer DES may convert data output from a phase detector (not shown) into a bus signal and output the bus signal. In an embodiment, for example, the de-serializer DES may convert data output from the phase detector into a bus signal of 2:24.

The register REG may store the frequency information FI and the phase information PI of the clock training pattern provided from the clock data recovery circuit CDR, and provide the frequency information FI and the phase information PI of the clock training pattern to the clock data recovery circuit CDR again.

In an embodiment, for example, the register REG may store the first frequency information and the first phase information of the first clock training pattern, and allow the clock data recovery circuit CDR to generate the second frequency information and the second phase information of the second clock training pattern by providing the first frequency information and the first phase information of the first clock training pattern in the second clock training pattern to the clock data recovery circuit CDR. Accordingly, in such an embodiment, a time for tracking the second frequency information and/or the second phase information of the second clock training pattern, that is, a locking time, may be shorter than a time for tracking the first frequency information and the first phase information of the first clock training pattern, that is, a locking time.

In an embodiment, the register REG may allow the clock data recovery circuit CDR to generate the third frequency information and the third phase information of the third clock training pattern by providing the second frequency information and the second phase information of the second clock training pattern in the third clock training pattern to the clock data recovery circuit CDR. Accordingly, in such an embodiment, a locking time for tracking the third frequency information and/or the third phase information of the third clock training pattern may be shorter than the locking time of the first clock training pattern, and may be different from the locking time of the second clock training pattern.

According to an embodiment, the register REG may allow the clock data recovery circuit CDR to use the first frequency information in the third frequency information of the third clock training pattern by providing the first frequency information and the second phase information in the third clock training pattern to the clock data recovery circuit CDR, and may allow the clock data recovery circuit CDR to generate the third phase information of the third clock training pattern based on the second phase information. This may be applied when an external factor such as a voltage or temperature applied to the clock data recovery circuit CDR in a predetermined period corresponds to a degree that does not affect a performance change of the clock data recovery circuit CDR.

The data reception controller DRX may be an analog logic capable of performing reception with the reception controller RXC. The data reception controller DRX may be included in the first data reception unit RX1. The data reception controller DRX may perform PHY protocol interface ("PPI") communication with the reception controller RXC.

Hereinafter, a plurality of driving modes for optimization between the reduction of the locking time of the clock training pattern CLK_T and the prevention of the electromagnetic interference will be described in detail with reference to FIGS. 7 to 9.

Figure 7:
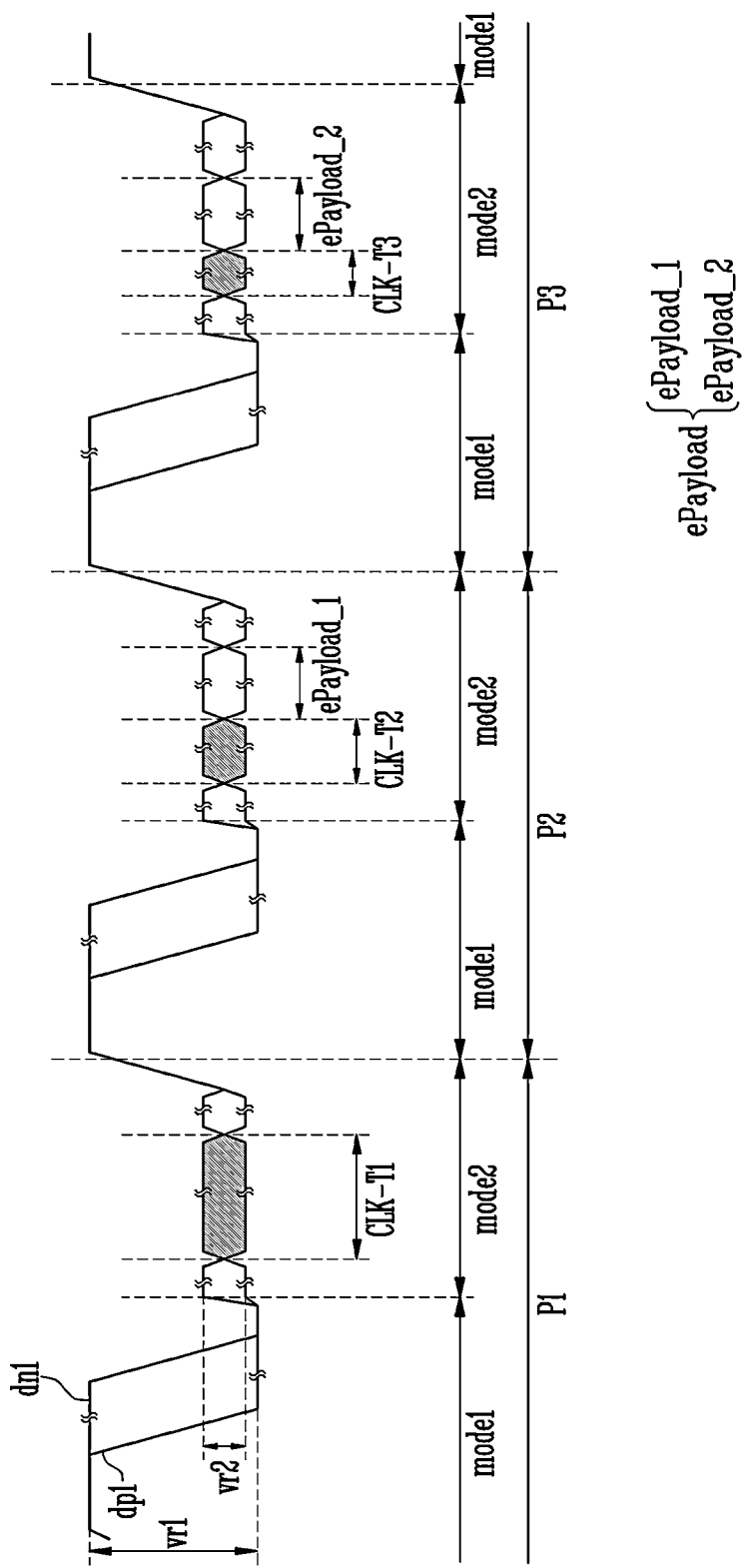
FIG. 7 is a diagram illustrating a difference of clock training patterns transmitted from the transmitter to the receiver in each of first to third periods.

FIG. 7 is a diagram illustrating a difference of the clock training patterns transmitted from the transmitter to the receiver in each of first to third periods. FIG. 8 is a table illustrating a set of first to third clock training patterns for each of first to fourth driving modes according to an embodiment. FIG. 9 is a table illustrating unit bits configuring the first to third clock training patterns according to an embodiment. In FIG. 7, for convenience of illustration and description, the remaining patterns HS-zero, HS-sync, STP, EDP, HS-Trail, and HS-exit are omitted and the clock training pattern CLK-T and the first payload ePayload are briefly shown in a second mode mode2.

Referring to FIGS. 1 and 7 to 9, an embodiment of the transmitter TXD may transmit a first clock training pattern CLK-T1 to the receiver RXD in a first period P1, transmit a second clock training pattern CLK-T2 and a first first payload ePayload_1 to the receiver RXD in a second period P2, and transmit a third clock training pattern CLK-T3 and a second first payload ePayload_2 to the receiver RXD in a third period P3.

In such an embodiment, the first period P1 may correspond to a period in which a skew (or a phase difference) between signals transmitted through different data lanes in the MIPI is corrected. In an embodiment, for example, the first period P1 may correspond to a start time point of a first frame when the transceiver TSCV is powered on. The first clock training pattern CLK-T1 of the first period P1 may be defined as an initial clock training pattern.

In a high-speed serial interface such as the MIPI, the first data Data1 (refer to FIG. 1) including a command and image data may be alternately transmitted through a data lane (that is, the first line dp1 and the second line dn1). Specifically, the command may be transmitted during a first period of one frame, and the first data may be transmitted during a second period of one frame. In an interface for transmitting and receiving image data, in general, the first period of the one frame is referred to as a command mode and the second period of the one frame is referred to as a video mode.

The transmitter TXD may not transmit the command to the receiver RXD during the video mode. Therefore, the transmitter TXD may temporarily store the command during the video mode and transmit the stored command to the receiver RXD during the command mode.

In an embodiment where data is transmitted in a clock embedded method, the transmitter TXD may generate the first first payload ePayload_1 and the second first payload ePayload_2 by encoding the first data Data1 (refer to FIG. 1) including image information.

In an embodiment, when the clock training patterns shown in FIG. 7 indicates the video mode, the second period P2 may correspond to a first horizontal period of a first frame. Therefore, the first first payload ePayload_1 may correspond to data provided to a first pixel row of the first frame among the first data Data1 (refer to FIG. 1). The second clock training pattern CLK-T2 of the second period P2 may be defined as a long clock training pattern. In such an embodiment, the third period P3 may correspond to a second horizontal period of the first frame. Therefore, the second first payload ePayload_2 may correspond to data provided to a second pixel row in one frame among the first data Data1 (refer to FIG. 1). The third clock training pattern CLK-T3 of the third period P3 may be defined as a short clock training pattern. In FIG. 7, only the first period P1 to the third period P3 are shown for convenience of illustration and description, but a plurality of periods may be further included after the third period P3, and the clock training pattern CLK-T of the plurality of periods may be the same as the third clock training pattern CLK-T3. That is, the clock training pattern CLK-T may be a short clock training pattern.

In an embodiment, when the clock training patterns shown in FIG. 7 indicates the command mode, the second period P2 may correspond to a second frame period. Therefore, the first first payload ePayload_1 may correspond to data provided to all pixel rows during the second frame among the first data Data1 (refer to FIG. 1). The second clock training pattern CLK-T2 of the second period P2 may be defined as a long clock training pattern, and the third period P3 may correspond to a third frame period of the frame. Therefore, the second first payload ePayload_2 may correspond to data provided to all pixel rows during the third frame among the first data Data1 (refer to FIG. 1). The third clock training pattern CLK-T3 of the third period P3 may be defined as a short clock training pattern.

According to an embodiment, a length of the first clock training pattern CLK_T1 may be longer than a length of the second clock training pattern CLK_T2 and a length of the third clock training pattern CLK_T3. In such an embodiment, the length of the first clock training pattern CLK_T1 corresponding to the initial clock training pattern is set to be sufficiently long, such that a time for tracking frequency information and/or phase information of the second clock training pattern CLK_T2, that is, a locking time, may be reduced. In such an embodiment, as described above with reference to FIG. 6, the transceiver TSCV may store second frequency information and second phase information of the second clock training pattern CLK-T2 using the register REG, and provide the second frequency information and the second phase information of the second clock training pattern CLK-T2 to the clock data recovery circuit CDR in the third clock training pattern CLK-T3, to allow third frequency information and third phase information of the third clock training pattern CLK-T3 to be generated. Accordingly, a time for tracking the third frequency information and/or the third phase information of the third clock training pattern CLK-T3, that is, a locking time, may be shorter than the time for tracking the second frequency information and the second phase information of the second clock training pattern CLK-T2, that is, the locking time.

In an embodiment, all of the first clock training pattern CLK-T1, the second clock training pattern CLK-T2, and the third clock training pattern CLK-T3 may be the same as each other. In such an embodiment, a combination of bits configuring the first clock training pattern CLK-T1, a combination of bits configuring the second clock training pattern CLK-T2, and a combination of bits configuring the third clock training pattern CLK-T3 may be the same as each other. In an embodiment, for example, all of the first clock training pattern CLK-T1, the second clock training pattern CLK-T2, and the third clock training pattern CLK-T3 may have a maximum frequency (a first driving mode DRM1 of FIG. 8). That is, all of the first to third clock training patterns CLK-T1, CLK-T2, and CLK-T3 may be a combination of bits in which one 1 and one 0 are repeated alternately with each other.

According to an embodiment, the first to third clock training patterns CLK-T1, CLK-T2, and CLK-T3 may be generated by repeating a fourth unit bit UB4 (24b'010101_010101_010101_010101) expressed by 24 bits as shown in FIG. 9. In an embodiment, for example, the first clock training pattern CLK-T1 may include three fourth unit bits UB4, the second clock training pattern CLK-T2 may include two fourth unit bits UB4, and the third clock training pattern CLK-T3 may include one fourth unit bit UB4. However, this is an example, and the number of the fourth unit bits UB4 included in the first to third clock training patterns CLK-T1, CLK-T2, and CLK-T3 may be increased or decreased in response to each of the lengths of the first period P1, the second period P2, and the third period P3. In addition, the number of the bits expressing the fourth unit bit UB4 may be varied.

In an embodiment, since the transition (change from 0 to 1 or change from 1 to 0) of the first to third clock training patterns CLK_T1, CLK_T2, and CLK_T3 becomes the maximum, the clock signal having the specific frequency and phase may be quickly generated by using the first to third clock training patterns CLK_T1, CLK_T2, and CLK_T3, and thus the locking time of the clock training pattern CLK_T may be minimized.

In such an embodiment, when the transition of the first to third clock training patterns CLK_T1, CLK_T2, and CLK_T3 is maximum, since a frequency of the first to third clock training patterns CLK_T1, CLK_T2, and CLK_T3 becomes maximum, a probability that electromagnetic interference occurs in the transceiver TSCV may increase.

Therefore, a driving method capable of minimizing the occurrence of the electromagnetic interference is desired for a stable operation of a system (for example, a display device) including the transceiver TSCV.

The transmitter TSCV may transmit signals having a first voltage range vr1 in a first mode mode1 to the first line dp1 and the second line dn1, and transmit signals having a second voltage range ve2 less than the first voltage range vr1 to the first line dp1 and the second line dn1 in a second mode mode2.

In the second mode mode2, the transmitter TSCV may transmit the first clock training pattern CLK-T1, the second clock training pattern CLK-T2, and the third clock training pattern CLK-T3 to the receiver RXD through the first line dp1 and the second line dn1.

In the above-described video mode, the transmitter TSCV may operate in a burst mode including the first mode mode1 between the second modes mode2 or a non-burst mode which does not includes the first mode between the second modes. That is, FIG. 7 shows the burst mode.

In an embodiment, the transceiver TSCV may vary the first clock training pattern CLK-T1, the second clock training pattern CLK-T2, and the third clock training pattern CLK-T3 for each of the plurality of driving modes.

Referring to FIGS. 8 and 9, the plurality of driving modes may include a first driving mode DRM1 in which all of the first clock training pattern CLK-T1, the second clock training pattern CLK-T2, and the third clock training pattern CLK-T3 have a maximum frequency, a second driving mode DRM2 in which only the first clock training pattern CLK-T1 has the maximum frequency, a third driving mode DRM3 in which only the second clock training pattern CLK-T2 and the third clock training pattern CLK-T3 have the maximum frequency, and a fourth driving mode DRM4 in which all of the first clock training pattern CLK-T1, the second clock training pattern CLK-T2, and the third clock training pattern CLK-T3 do not have the maximum frequency.

In an embodiment, as described above, the first driving mode DRM1 may be a mode that primarily considering the reduction of the locking time of the clock training pattern. The second driving mode DRM2 and the third driving mode DRM3 may be modes that consider both of the reduction of the locking time of the clock training pattern and minimization of the occurrence of the electromagnetic interference. The fourth driving mode DRM4 may be a mode that primarily considers the minimization of the occurrence of the electromagnetic interference.

The second driving mode DRM2 may prioritize the reduction of the locking time of the clock training pattern in the first period P1 (that is, the initial training period), and may prioritize the minimization of the occurrence of the electromagnetic interference in the second period P2 (that is, the long training period) and the third period P3 (that is, the short training period), in the non-burst mode.

Therefore, in the second driving mode DRM2, the first clock training pattern CLK-T1 may have the maximum frequency. That is, the first clock training pattern CLK-T1 may be a combination of bits in which one 1 and one 0 are repeated alternately with each other. According to an embodiment, the first clock training pattern CLK-T1 may be generated by repeating the fourth unit bit UB4 24b'010101 010101 010101 010101 expressed by 24 bits shown in FIG. 9. In an embodiment, for example, the first clock training pattern CLK-T1 may include three fourth unit bits UB4.

In the second driving mode DRM2, the second clock training pattern CLK-T2 may be different from the first clock training pattern CLK-T1. According to an embodiment, the second clock training pattern CLK-T2 may be generated by repeating any one of first to third unit bits UB1, UB2, and UB3 except for the fourth unit bit UB4 expressed by 24 bits shown in FIG. 9. That is, the second clock training pattern CLK-T2 may be generated by repeating twice any one of the first unit bit UB1 (24b'000111_111000_000111_111000), the second unit bit UB2 (24b' 000111_000111_000111_000111), and the third unit bit UB3 (24b'001101 001101 001101 001101) in the second driving mode DRM2.

In the second driving mode DRM2, the third clock training pattern CLK-T3 may be different from the second clock training pattern CLK-T2. According to an embodiment, the third clock training pattern CLK-T3 may be generated by any one of remaining bits except for the unit bit selected in the second clock training pattern CLK-T2 among the plurality of unit bits UB1 to UB4 expressed by 24 bits shown in FIG. 9. In an embodiment, for example, when the second clock training pattern CLK-T2 is generated by the second unit bit UB2, the third clock training pattern CLK-T3 may be generated by any one of the first unit bit UB1 (24b'000111_111000_000111_111000), the third unit bit UB3 (24b'001101 001101 001101 001101), and the fourth unit bit UB4 (24b'010101_010101_010101_010101) in the second driving mode DRM2.

In such an embodiment, since the first unit bit UB1 includes 4 transitions, the second unit bit UB2 includes 7 transitions, the third unit bit UB3 includes 15 transitions, and the fourth unit bit UB4 includes 23 transitions, a frequency may be decreased from the fourth unit bit UB4 to the first unit bit UB1.

The third driving mode DRM3 may prioritize the minimization of the occurrence of the electromagnetic interference in the first period P1 (that is, the initial training period) and may prioritize the reduction of the locking time of the clock training pattern in the second period P2 (that is, the long training period) and the third In the period P3 (that is, the short training period), in the burst mode.

Therefore, in the third driving mode DRM3, the first clock training pattern CLK-T1 may be different from the second clock training pattern CLK-T2 and the third clock training pattern CLK-T3. According to an embodiment, the first clock training pattern CLK-T1 may be generated by repeating any one of the first to third unit bits UB1, UB2, and UB3 except for the fourth unit bit UB4 expressed by 24 bits shown in FIG. 9. That is, the first clock training pattern CLK-T1 may be generated by repeating any one the first unit bit UB1 (24b'000111 111000 000111 111000), the second unit bit UB2 (24b' 000111 000111 000111 000111), and the third unit bit UB3 (24b'001101_001101_001101_001101) three times in the third driving mode DRM3.

In the third driving mode DRM3, the second clock training pattern CLK-T2 and the third clock training pattern CLK-T3 may have the maximum frequency. That is, the second clock training pattern CLK-T2 and the third clock training pattern CLK-T3 may be a combination of bits in which one 1 and one 0 are repeated alternately with each other. According to an embodiment, the second clock training pattern CLK-T2 and the third clock training pattern CLK-T3 may be generated by repeating the fourth unit bit UB4 (24b'010101_010101_010101_010101) expressed by 24 bits shown in FIG. 9. In an embodiment, for example, the second clock training pattern CLK-T2 may include two fourth unit bits UB4, and the third clock training pattern CLK-T3 may include one fourth unit bit UB4 in the third driving mode DRM3.

The fourth driving mode DRM4 may prioritize the minimization of the occurrence of the electromagnetic interference in all of the first period P1 (that is, the initial training period), the second period P2 (that is, the long training period), and the third period P3 (that is the short training period).

Therefore, in the fourth driving mode DRM4, the first clock training pattern CLK-T1, the second clock training pattern CLK-T2, and the third clock training pattern CLK-T3 may be different from each other. That is, the first clock training pattern CLK-T1 may be different from both of the second clock training pattern CLK-T2 and the third clock training pattern CLK-T3, the second clock training pattern CLK-T2 may be different from both of the first clock training pattern CLK-T1 and the third clock training pattern CLK-T3, and the third clock training pattern CLK-T3 may be different from both of the first clock training pattern CLK-T1 and the second clock training pattern CLK-T2.

In an embodiment, for example, the first clock training pattern CLK-T1 may include three first unit bits UB1 (24b'000111_111000_000111_111000), the second clock training pattern CLK-T2 may include two second unit bits UB2 (24b' 000111 000111 000111 000111), and the third clock training pattern CLK-T3 may include one third unit bit UB3 (24b'001101_001101_001101_001101) in the fourth driving mode DRM4.

However, a configuration of the plurality of unit bits UB1 to UB4 shown in FIG. 9 is an example, and the length and type of the unit bit are not limited thereto. In an embodiment, for example, an additional unit bit may be generated by changing the number of the transitions included in the unit bit, or the length of the bit may be expressed by 2 bits, 3 bits, and 4 bits instead of 24 bits.

In an embodiment, as described above, the transceiver TSCV may optimize clock training performance in consideration of the trade-off relationship between the reduction of locking time of the clock training pattern CLK_T and the minimization of the occurrence of the electromagnetic interference, by varying the combination of the first to third clock training patterns CLK-T1 to CLK-T3 for each of the plurality of driving modes DRM1 to DRM4.

Hereinafter, alternative embodiments will be described. In such embodiments, any repetitive detailed description of the same or like configuration as that of the embodiment described above will be omitted or simplified, and a difference is mainly described.

FIG. 10 is a table illustrating a set of the first to third clock training patterns for each of the first to fourth driving modes according to an alternative embodiment.

The embodiment shown in FIG. 10 is substantially the same as the embodiment shown in FIG. 8 except that all of the first clock training pattern CLK-T1, the second clock training pattern CLK-T2, and the third clock training pattern CLK-T3 are configured shuffle patterns in a case where the first clock training pattern CLK-T1, the second clock training pattern CLK-T2, and the third clock training pattern CLK-T3 are not configured by the fourth unit bit UB4. Hereinafter, any repetitive detailed description of the same or like elements as those described above will be omitted, and a method of configuring the first clock training pattern CLK-T1, the second clock training pattern CLK-T2, and the third clock training pattern CLK-T3 as the shuffle patterns will be mainly described.

Referring to FIGS. 7 to 10, the plurality of driving modes may include a first driving mode DRM1_1 in which all of the first clock training pattern CLK-T1, the second clock training pattern CLK-T2, and the third clock training pattern CLK-T3 have the maximum frequency, a second driving mode DRM2_1 in which only the first clock training pattern CLK-T1 has the maximum frequency, a third driving mode DRM3_1 in which only the second clock training pattern CLK-T2 and the third clock training pattern CLK-T3 have the maximum frequency, and a fourth driving mode DRM4_1 in which all of the first clock training pattern CLK-T1, the second clock training pattern CLK-T2, and the third clock training pattern CLK-T3 do not have the maximum frequency.

In an embodiment, as described above, the first driving mode DRM1_1 may be a mode that primarily considering the reduction of the locking time of the clock training pattern. The second driving mode DRM2_1 and the third driving mode DRM3_1 may be modes that consider both of the reduction of the locking time of the clock training pattern and the minimization of the occurrence of the electromagnetic interference. The fourth driving mode DRM4_1 may be a mode that primarily considers the minimization of the occurrence of the electromagnetic interference.

In such an embodiment where the first clock training pattern CLK-T1, the second clock training pattern CLK-T2, and the third clock training pattern CLK-T3 do not configured by the fourth unit bit UB4 and are configured as the shuffle patterns, an electromagnetic interference occurrence prevention effect may occur more likely.

In the second driving mode DRM2_1 and the fourth driving mode DRM4_1, the second clock training pattern CLK-T2 and the third clock training pattern CLK-T3 may be shuffle patterns. According to an embodiment, the second clock training pattern CLK-T2 may be generated by selecting two of the first to fourth unit bits UB1, UB2, UB3, and UB4 shown in FIG. 9. In an embodiment, for example, the second clock training pattern CLK-T2 may include the third unit bit UB3 (24b'001101_001101_001101_001101) and the fourth unit bit UB4 (24b'010101_010101_010101_010101). In addition, the third clock training pattern CLK-T3 may be generated by selecting any one of the first to fourth unit bits UB1, UB2, and UB4 shown in FIG. 9. In an embodiment, for example, the third clock training pattern CLK-T3 may include the fourth unit bit UB4 (24b'010101_010101_010101_010101).

In such an embodiment, in the third driving mode DRM3_1 and the fourth driving mode DRM4_1, the first clock training pattern CLK-T1 may be the shuffle pattern. According to an embodiment, the first clock training pattern CLK-T may be generated by selecting three of the first to fourth unit bits UB1, UB2, UB3, and UB4 shown in FIG. 9. In an embodiment, for example, the first clock training pattern CLK-T1 may include the first unit bit UB1 (24b'000111_111000_000111_111000), the second unit bit UB2 (24b' 000111 000111 000111 000111), and the third unit bit UB3 (24b'001101 001101 001101 001101).

In an embodiment, as described above, the shuffle pattern may be generated by a combination of the unit bits UB1 to UB4 expressed by 24 bits of FIG. 9, but not being limited thereto. Alternatively, as described above, since the length of the unit bits UB1 to UB4 may be variously deformable, the shuffle pattern may be formed by a combination of unit patterns expressed by 2 bits, 3 bits, 4 bits, and the like, and the lengths of the first clock training pattern CLK-T1, the second clock training pattern CLK-T2, and the third clock training pattern CLK-T3 may also be changed.

Accordingly, randomness of the shuffle patterns configuring the first clock training pattern CLK-T1, the second clock training pattern CLK-T2, and the third clock training pattern CLK-T3 may be strengthened, and substantially the same effect as a pseudo random binary sequence ("PRBS") having a pattern made pseudo-randomly, which is not a completely random bit sequence, may be expected.

In such an embodiment, the shuffle patterns configuring the first clock training pattern CLK-T1, the second clock training pattern CLK-T2, and the third clock training pattern CLK-T3 may have randomness. Therefore, the shuffle pattern once determined may not be continuously used fixedly, but the shuffle pattern may be newly generated every time the first to third periods P1 to P3 are entered.

Accordingly, power of the first clock training pattern CLK-T1, the second clock training pattern CLK-T2, and the third clock training pattern CLK-T3 may be distributed by periodically changing the frequencies of the first clock training pattern CLK-T1, the second clock training pattern CLK-T2, and the third clock training pattern CLK-T3 to reduce electromagnetic interference in a frequency domain. Therefore, a spread spectrum clock generation ("SSCG") effect may be substantially expected.

Figure 11A:
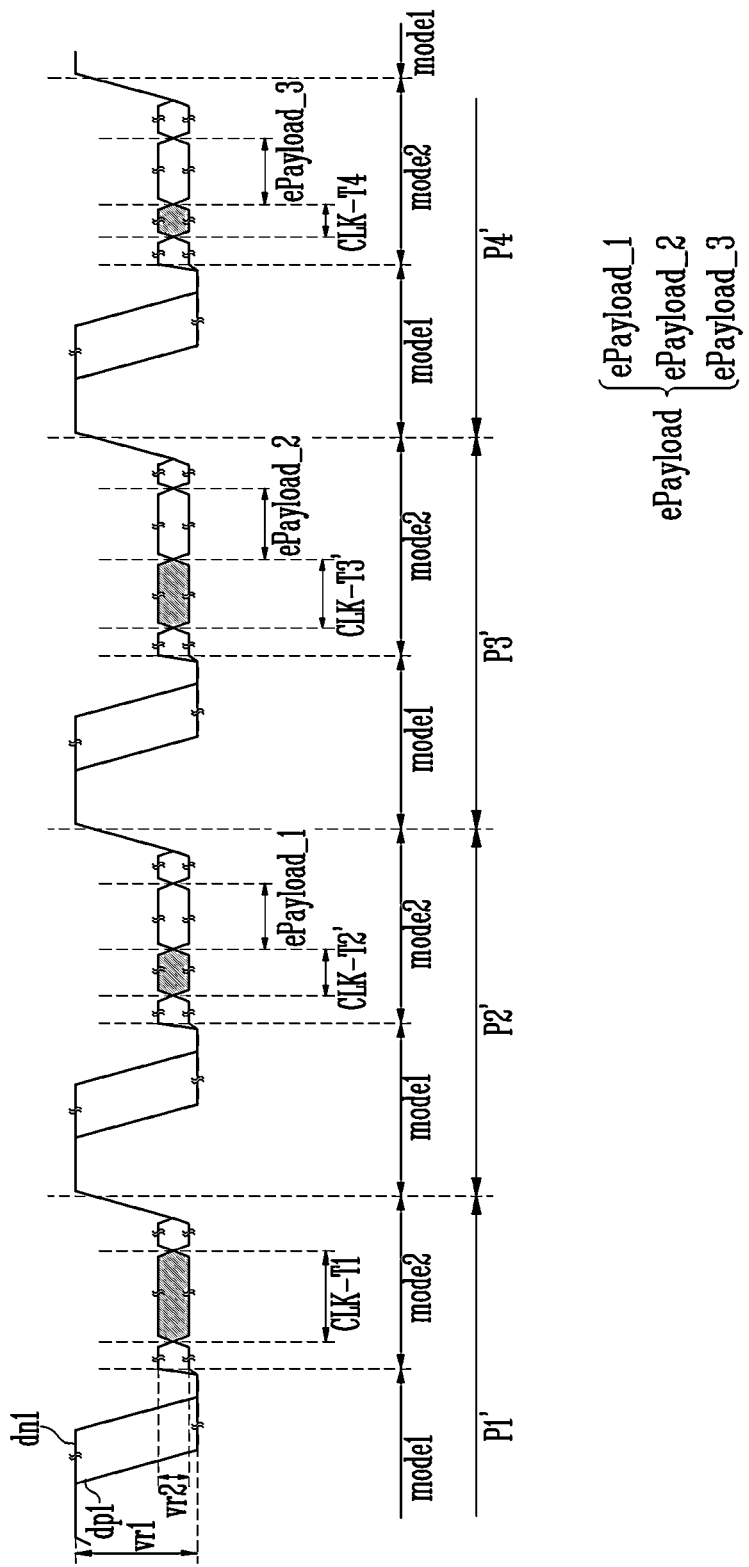
FIGS. 11A and 11B are diagrams illustrating a modified embodiment of an embodiment shown of FIG. 7.
Figure 11B:
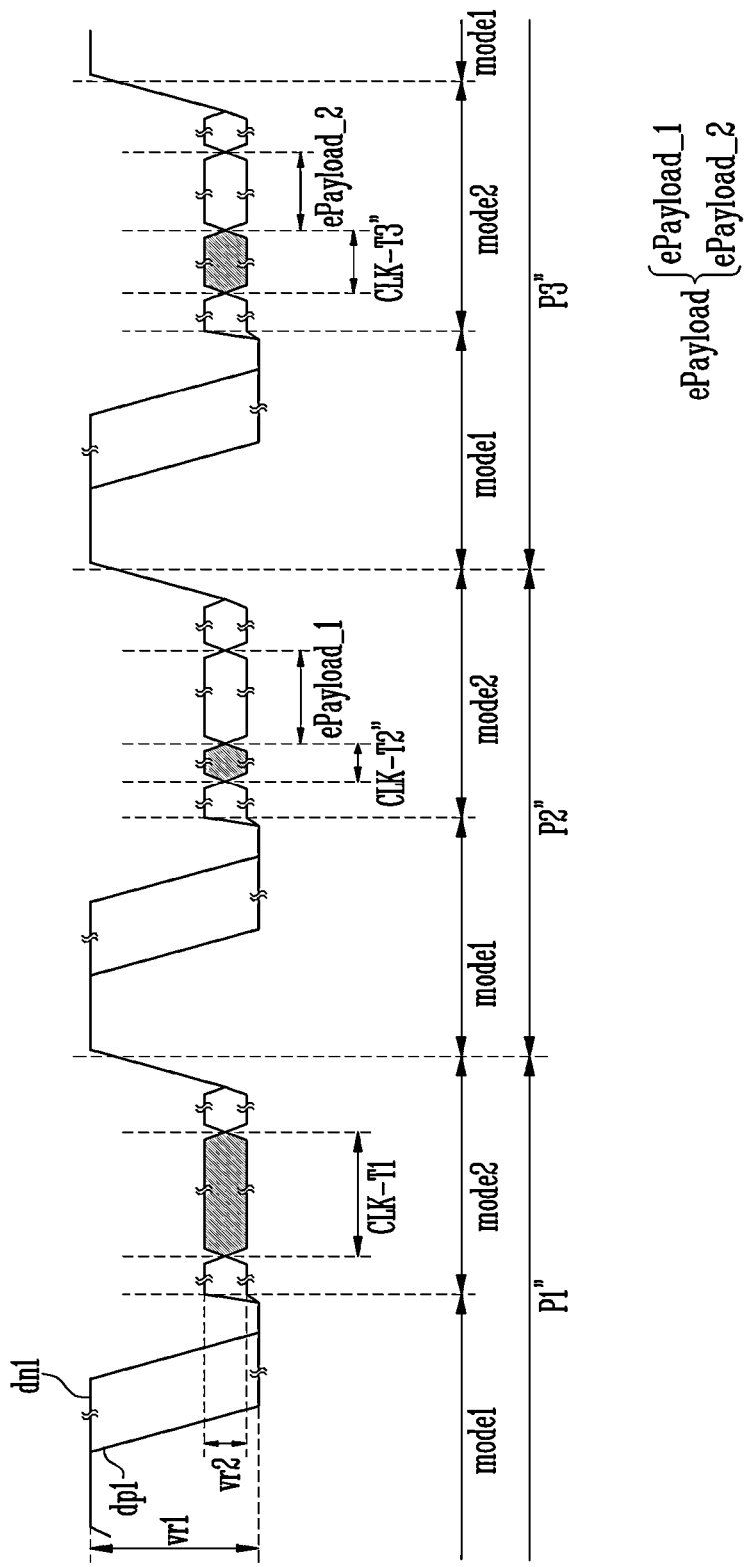

FIGS. 11A and 11B are diagrams illustrating a modified embodiment of the embodiment shown of FIG. 7.

The embodiment shown in FIG. 11A is substantially the same as the embodiment shown of FIG. 7 except that the embodiment shown in FIG. 11A includes a more long training pattern (that is, a third clock training pattern CLK-T3' of FIG. 11A) having a length different from those of the long training pattern (that is, the second clock training pattern CLK-T2 of FIG. 7) and the short training pattern (that is, the third clock training pattern CLK-T3 of FIG. 7) and except that the short training pattern (that is, the third clock training pattern CLK-T3 of FIG. 7) is transmitted in a second period P2", and the long training pattern (that is, the second clock training pattern CLK-T2 of FIG. 7) is transmitted in a third period P3".

Referring to FIGS. 7 and 11A, in an alternative embodiment, the transmitter TXD may transmit the first clock training pattern CLK-T1 to the receiver RXD in a first period P1', transmit a second clock training pattern CLK-T2' and the first first payload ePayload_1 to the receiver RXD in a second period P2', transmit the third clock training pattern CLK-T3' and the second first payload ePayload_2 to the receiver RXD in a third period P3', and transmit a fourth clock training pattern CLK-T4 and the third first payload ePayload_3 to the receiver RXD in a fourth period P4'.

The length of the first clock training pattern CLK-T1 may be longer than a length of the second clock training pattern CLK-T2', a length of the third clock training pattern CLK-T3', and a length of the fourth clock training pattern CLK-T4.

The length of the third clock training pattern CLK-T3' may be longer than both of the length of the second clock training pattern CLK-T2' and the length of the fourth clock training pattern CLK-T4, and the length of the second clock training pattern CLK-T2' may be longer than the length of the fourth clock training pattern CLK-T4.

In an embodiment, referring to FIGS. 8 and 10, the third clock training pattern CLK-T3' may be the fourth unit bit UB4 in the first driving mode DRM1_1 and the third driving mode DRM_3. In such an embodiment, the third clock training pattern CLK-T3' may be different from the second clock training pattern CLK-T2' and the fourth clock training pattern CLK-T4 or may be the shuffle pattern in the second driving mode DRM1_2. In such an embodiment, the third clock training pattern CLK-T3' may be different from the first clock training pattern CLK-T1, the second clock training pattern CLK-T2', and the fourth clock training pattern CLK-T4 or may be the shuffle pattern in the fourth driving mode DRM1_4.

Referring to FIGS. 7 and 11B, in another alternative embodiment, the transmitter TXD may transmit the first clock training pattern CLK-T1 to the receiver RXD in a first period P1", transmit the second clock training pattern CLK-T2" and the first first payload ePayload_1 to the receiver RXD in the second period P2", and transmit the third clock training pattern CLK-T3' and the second first payload ePayload_2 to the receiver RXD in the third period P3".

The length of the first clock training pattern CLK-T1 may be longer than the length of the second clock training pattern CLK-T2" and the length of the third clock training pattern CLK-T3". The length of the second clock training pattern CLK-T2" may be shorter than the length of the third clock training pattern CLK-T3".

The embodiment of FIGS. 11A and 11B corresponds to an embodiment in which lengths of the clock training patterns CLK-T2', CLK-T2", CLK-T3', CLK-T3", and CLK-T4 provided in the second period P2' and P2", the third period P3' and P3", and the fourth period P4 are variable. Accordingly, randomness of the first to fourth clock training patterns CLK-T1, CLK-T2', CLK-T2", CLK-T3', CLK-T3", and CLK-T4 described with reference to FIG. 10 be strengthened.

Figure 12:
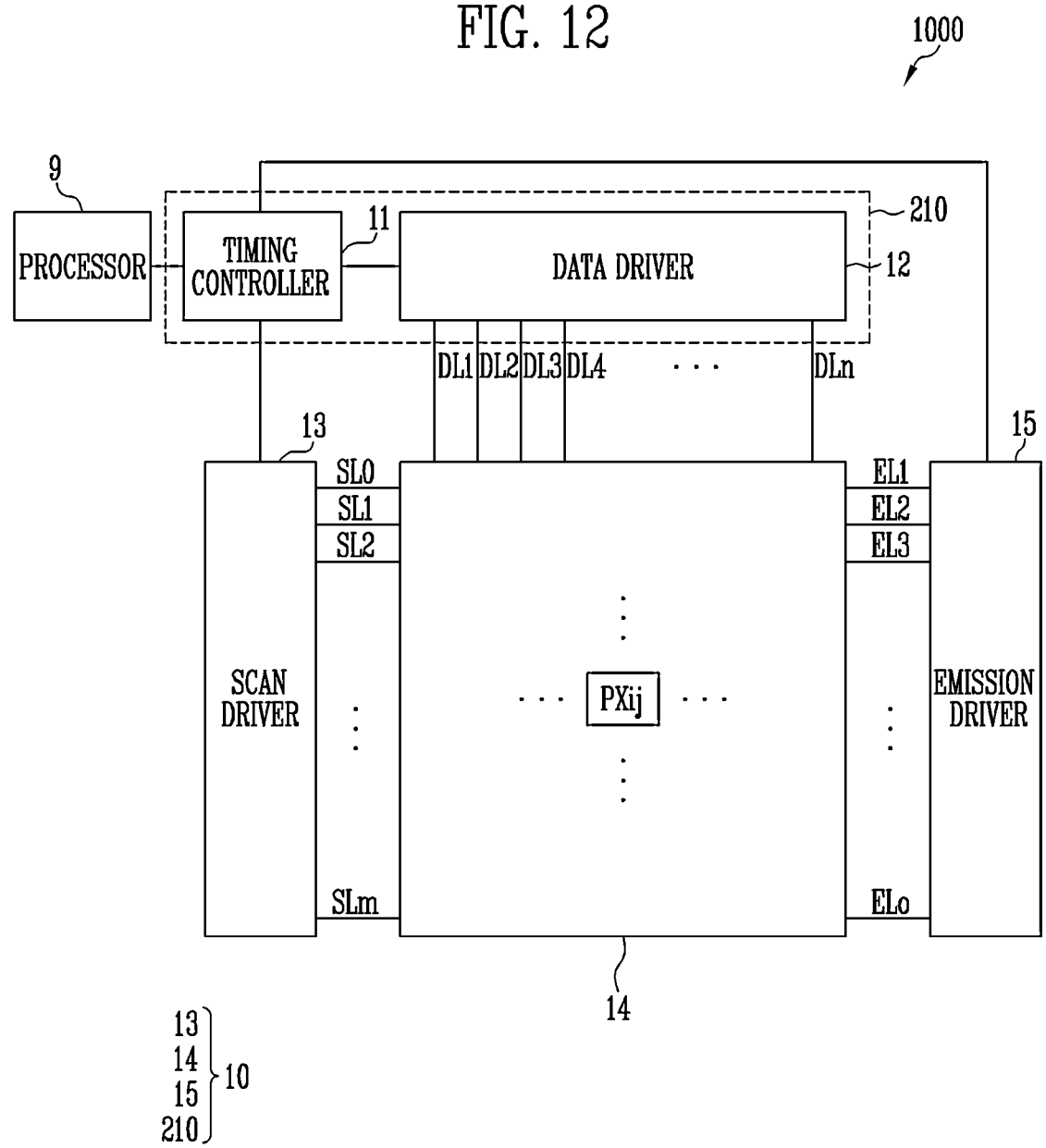
FIG. 12 is a block diagram illustrating a display system according to an embodiment of the disclosure.

FIG. 12 is a block diagram illustrating a display system according to an embodiment of the disclosure.

Referring to FIGS. 1 and 12, an embodiment of the display system 1000 may include a display module 10 and a processor 9.

In an embodiment, the transceiver device TSCV may be in charge of or perform communication and data transmission/reception between the display module 10 and the processor 9.

The display module 10 may include a timing controller 11, a data driver 12, a scan driver 13, a pixel unit 14, and an emission driver 15. In embodiments, each functional unit may be integrated into a single IC, integrated into a plurality of ICs, or mounted on a display substrate. In an embodiment, the timing controller 11 and the data driver 12 may be integrated into a single IC and may be configured as one display driver 210. In such an embodiment, the display driver 210 may be referred to as the above-described TED. According to an embodiment, the display driver 210 may further include at least one selected from the scan driver 13 and the emission driver 15.

The processor 9 may correspond to at least one selected from a GPU, a CPU, an AP, and the like. In an embodiment, the processor 9 may output image data to be used in the display module 10.

The processor 9 may include the transmitter TXD described above. In an embodiment, the timing controller 11, the data driver 12, or the display driver 210 may include the receiver RXD described above.

The timing controller 11 may receive grayscales and timing signals for each display frame period from the processor 9. The timing signals may include a vertical synchronization signal, a horizontal synchronization signal, a data enable signal, and the like.

The timing controller 11 may receive grayscales and timing signals for each display frame period from the processor 9. The timing signals may include a vertical synchronization signal, a horizontal synchronization signal, a data enable signal, and the like.

The timing controller 11 may provide rendered or non-rendered grayscales to the data driver 12. In addition, the timing controller 11 may provide a data driving control signal to the data driver 12.

The timing controller 11 may provide a scan driving control signal to the scan driver 13 and may provide an emission driving control signal to the light emission driver 15.

The data driver 12 may generate data voltages (that is, data signals) to be provided to data lines DL1, DL2, DL3, DL4, . . . , and DLn (where n is an integer greater than 0) using the grayscales and the data driving control signal received from the timing controller 11.

The scan driver 13 may generate scan signals to be provided to scan lines SL0, SL1, SL2, . . . , and SLm (where m is an integer greater than 0) using the scan drive control signal (for example, a clock signal, a scan start signal, and the like) received from the timing controller 11. The scan driver 13 may sequentially supply scan signals having a turn-on level pulse to the scan lines SL0, SL1, SL2, . . . , and SLm.

The emission driver 15 may generate emission control signals to be provided to emission control lines EL1, EL2, EL3, . . . , and ELo (where o is an integer greater than 0) using the emission control signal (for example, a clock signal, an emission control start signal, and the like) received from the timing controller 11. The emission driver 15 may sequentially supply emission control signals to the emission control lines EL1, EL2, EL3, . . . , and ELo.

The pixel unit 14 may include pixels PXij (where i is a positive integer less than or equal to m, and j is a positive integer less than or equal to n). The pixel PXij may be connected to corresponding data line, scan line, and emission control line. The pixel PXij may emit light with a luminance corresponding to the data signal.

In embodiments of the invention, as set forth herein, the transceiver may optimize clock training performance in consideration of a trade-off relationship of reduction of a locking time of a clock training pattern and reduction of electromagnetic interference, by variously changing a length of the clock training pattern and a bit combination of the clock training pattern.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A transceiver device comprising:
   a transmitter and a receiver, which are connected to each other through a first line and a second line,
   wherein the transmitter transmits a first clock training pattern to the receiver in a first period, transmits a second clock training pattern and a first first payload to the receiver in a second period, and transmits a third clock training pattern and a second first payload to the receiver in a third period, and
   wherein the first clock training pattern, the second clock training pattern, and the third clock training pattern are variable based on a plurality of driving modes.

2. The transceiver device according to claim 1, wherein a length of the first clock training pattern is longer than a length of the second clock training pattern and a length of the third clock training pattern.

3. The transceiver device according to claim 2, wherein the length of the second clock training pattern is longer or shorter than the length of the third clock training pattern.

4. The transceiver device according to claim 1, wherein the transmitter transmits signals having a first voltage range to the first line and the second line in a first mode, and
   the transmitter transmits signals having a second voltage range less than the first voltage range to the first line and the second line in a second mode.

5. The transceiver device according to claim 4, wherein the transmitter transmits the first clock training pattern, the second clock training pattern, and the third clock training pattern to the receiver in the second mode.

6. The transceiver device according to claim 5, wherein the transmitter includes a burst mode including the first mode between the second modes and a non-burst mode which does not includes the first mode between the second modes.

7. The transceiver device according to claim 6, wherein the driving modes comprise:
   a first driving mode in which all of the first clock training pattern, the second clock training pattern, and the third clock training pattern have a maximum frequency;
   a second driving mode in which only the first clock training pattern has the maximum frequency;
   a third driving mode in which only the second clock training pattern and the third clock training pattern have the maximum frequency; and
   a fourth driving mode in which all of the first clock training pattern, the second clock training pattern, and the third clock training pattern do have the maximum frequency.

8. The transceiver device according to claim 7, wherein the second clock training pattern is different from the first clock training pattern, and
   the third clock training pattern is different from the second clock training pattern in the second driving mode.

9. The transceiver device according to claim 7, wherein both of the second clock training pattern and the third clock training pattern are shuffle patterns in the second driving mode.

10. The transceiver device according to claim 7, wherein the first clock training pattern is different from both of the second clock training pattern and the third clock training pattern in each of the third driving mode and the fourth driving mode.

11. The transceiver device according to claim 10, wherein the first clock training pattern is a shuffle pattern in the third driving mode.

12. The transceiver device according to claim 10, wherein the second clock training pattern is different from both of the first clock training pattern and the third clock training pattern in the fourth driving mode.

13. The transceiver device according to claim 10, wherein the third clock training pattern is different from both of the first clock training pattern and the second clock training pattern in the fourth driving mode.

14. The transceiver device according to claim 10, wherein all of the first clock training pattern, the second clock training pattern, and the third clock training pattern are shuffle patterns in the fourth driving mode.

15. The transceiver device according to claim 7, wherein the first driving mode and the third driving mode are driven in the burst mode, and
the second driving mode is driven in the non-burst mode.

16. The transceiver device according to claim 1, wherein the transmitter generates the first first payload and the second first payload by encoding first data including image information.

17. The transceiver device according to claim 16, wherein the first first payload corresponds to a first pixel row in one frame of the first data, and
the second first payload corresponds to a second pixel row of the first data.

18. The transceiver device according to claim 16, wherein the first first payload corresponds to a second frame of the first data, and
the second first payload corresponds to a third frame of the first data.

19. The transceiver device according to claim 1, wherein the transmitter further transmits a fourth clock training pattern and a third first payload to the receiver in a fourth period, and
a length of the first clock training pattern is longer than a length of the second clock training pattern, a length of the second clock training pattern, a length of the third clock training pattern, and a length of the fourth clock training pattern.

20. The transceiver device according to claim 19, wherein the length of the third clock training pattern is longer than both of the length of the second clock training pattern and the length of the fourth clock training pattern.

* * * * *